United States Patent [19]
Sato et al.

[11] 3,879,319
[45] Apr. 22, 1975

[54] SILICONE RESIN MOLDING COMPOSITIONS

[75] Inventors: Yasuhiko Sato; Yasuaki Hara, both of Annaka, Japan

[73] Assignee: Shinetsu Chemical Company

[22] Filed: Feb. 2, 1973

[21] Appl. No.: 329,058

[30] Foreign Application Priority Data
Feb. 4, 1972  Japan ........................... 47-12638

[52] U.S. Cl. ............ 260/18 S; 117/135.1; 260/22 S; 260/31.2 R; 260/31.6; 260/31.8 S; 260/31.4 R; 260/37 SB; 260/46.5 R; 260/824 R
[51] Int. Cl. ............................................ C08g 51/72
[58] Field of Search ......... 260/46.5 R, 18 S, 31.4 R, 260/31.6, 31.8 S, 31.2 R, 37 SB, 22 S, 824 R

[56] References Cited
UNITED STATES PATENTS 3,208,961   9/1965   Kookootsedes .................... 260/18 S
3,264,260   8/1966   Muller et al. ...................... 260/18 S

*Primary Examiner*—Melvyn I. Marquis
*Attorney, Agent, or Firm*—McGlew and Tuttle

[57] ABSTRACT

Silicone resin compositions comprising an ester-modified organopolysiloxane resin which is produced by modifying an organopolysiloxane resin containing substituted or unsubstituted silicon-bonded organic monovalent hydrocarbon groups, the ratio of the organic groups to silicon atoms being from 1:1 to 1.6:1, with at least one ester having molecular weight exceeding 300 and being a condensation product of an aliphatic polyol and an organocarboxylic acid, an inorganic filler, and a curing catalyst. They are suitable especially for molding transfer molding compositions to give articles having improved moisture resistance and adhesive ability to metallic surfaces and also a fine texture with few microvoids.

7 Claims, No Drawings

1

SILICONE RESIN MOLDING COMPOSITIONS

SUMMARY OF THE INVENTION

This invention relates to silicone resin molding compositions, and more particularly to the compositions suitable for application to molding, especially, transfer molding because of their good fluidity, and capability of giving to the molded objects improved moisture resistance and sufficient adhesion to metallic surfaces.

Silicone resin molding compositions blended with filler, curing catalyst and other additives have been known. Examples of these compositions are silicone resin compositions which comprise phenyl polysiloxane resin, a filler, nd a curing catalyst selected from the group consisting of lead compounds, carboxylic acids and ammonium salts of the carboxylic acids, as disclosed in German Pat. Application published under No. 1,233,593, and those which comprise phenylpolysiloxane resin and a nonsolid hydroxylated compound selected from the group consisting of aliphatic and cycloaliphatic alcohols, hydroxylated aromatic compounds, and aliphatic, cycloaliphatic and aromatic polyols and also a lead compound as the catalyst, as disclosed in U.S. Pat. No. 3,264,260.

Although these known silicone resin molding compositions are capable of use in making molded articles made therefrom having superior heat-resistance and electrical properties, they exhibit disadvantages that their adhesion to metal surfaces is poor when cured in contact with the surfaces in the course of molding, and also that they cause the molded products to possess poor moisture resistance.

A main object of the present invention is to provide silicone resin molding compositions which are free from the above-mentioned disadvantages, especially suitably for transfer molding.

The composition of the invention comprises essentially (a) an organopolysiloxane resin containing substituted or unsubstituted silicon-bonded organic monovalent hydrocarbon groups, the ratio of the organic groups to silicon atoms being from 1:1 to 1.6:1, modified with an ester having a molecular weight exceeding 300, being a condensation product of an aliphatic polyol and an organocarboxylic acid, (b) an inorganic filler, and (c) a curing catalyst. These compositions will become so fluid when heated that they are suitable particularly for transfer molding among other injection and compression molding methods. Besides, compared with the known silicone compositions, they are superior in producing moldings having improved moisture resistance and adhesive ability to metallic surfaces, and also a fine texture with few microvoids.

The esters suitable for the modification of the organopolysiloxane resins that can be used in the invention may be any esters that have a molecular weight exceeding 300, consisting of, for example, low molecular weight alcohols such as methanol and propanol and high molecular weight carboxylic acids, or high molecular weight alcohol and low molecular weight carboxylic acids such as acetic acids. Esters having unsaturated bonds in their aliphatic groups are particularly preferred. Any esters that have a Too low molecular weight tend to cause molded articles concerned to decrease moisture resistance and adhesive ability to metallic surfaces, failing to attain the objects of the invention. Therefore, the ester employed must have been an ester that has a molecular weight of at least 300.

Examples of such suitable esters are glycerine esters of such higher aliphatic acids as linseed oil, soybean oil, dehydrated castor oil, tung oil, oiticica oil, poppy oil, sunflower oil, walnut oil, hempseed oil, perilla oil, thyme oil and cotton seed oil, glycerine esters of acids derived from the above-mentioned oils, polyethylene glycol diacetate, sorbitol trioleate, dioctyl sebacate, glyceryl tricapronate, and butyl stearate. Esters having comparatively low molecular weight, not exceeding 300, such as glyceryl phthalate, glyceryl isophthalate, glyceryl terephthalate ester, ethylene glycol terephthalate, glycol diphenylate, glyceryl, and glyceryl stilbene dicarboxylate, may be employed in combination with the above-mentioned esters, provided the average molecular weight of the mixture exceeds 300.

The organopolysiloxane to be modified by the ester is a known varnish-type silicone resin having the previously mentioned ratio of the organic groups to silicon atoms of from 1:1 to 1.6:1, and containing a variety of siloxane units, such as $C_6H_5SiO_{1.5}$, $(C_6H_5)_2SiO$, $CH_3SiO_{1.5}$ $(CH_3)_2SiO$, $(CH_3)C_6H_5SiO$, $C_2H_5SiO_{1.5}$, $(C_2H_5)_2SiO$, $(C_2H_5)C_6H_5SiO$, $C_3H_7SiO_{1.5}$, $(C_3H_7)_2SiO$, $(C_3H_7)C_6H_5SiO$, $CH_2=CHSiO_{1.5}$, $(CH_2=CH)CH_3SiO$, $(CH_2=CH)C_6H_5SiO$, $CH_2=CHCH_2SiO_{1.5}$ $(CF_3CH_2CH_2)CH_3SiO$, $ClCH_2CH_2CH_2SiO_{1.5}$, $C_6H_{11}SiO_{1.5}$ $Cl_2C_6H_3SiO_{1.5}$, $CF_3C_6H_4SiO_{1.5}$, $(C_6H_5)CF_3CH_2CH_2SiO$, $CH_3C_6H_4SiO_{1.5}$, $SiO_2$, $C_6H_5CH_2SiO_{1.5}$. A desired organopolysiloxane having one of the above structural units can usually be prepared by hydrolyzing and condensing mixtures of proper kinds of the organohalosilane or alkoxysilane in such amounts that the resulting organopolysiloxane will have the ratio of the organic groups to silicon atoms of from 1:1 to 1.6:1. The organopolysiloxane thus prepared usually contains silanol groups, and it is preferred that the silanol groups are at least 0.25% by weight so that the composition concerned may cure in a short period of time in the transfer molding.

The modification of an organopolysiloxane resin by an ester having a molecular weight exceeding 300 is conducted merely by uniformly mixing the organopolysiloxane resin and the ester in certain amounts but it is preferred to heat the mixture in the presence of an organic solvent such as toluene or xylene, which will result in the improvements in quality of molded products. The amount of the ester to be employed is in the range of from 3 to 30 parts by weight, preferably from 5 to 20 parts by weight per 100 parts by weight of the organopolysiloxane resin. If a larger amount of the ester is used, the curing velocity of the molded products will be lowered and the heat resistance of the products be reduced. Further, the esters that are used suitably in the invention should have an acid value not exceeding 50, preferably 20. If the acid value is greater, it would cause to retard the curing rate in the molding process and decrease the thermal stability of the resulting molded products.

In order to obtain molded products having dimensional stability and improved mechanical strength and heat resistance, an inorganic filler or fillers may be included in the silicone resin composition of the invention. Such fillers are selected from the group consisting of glass powder, asbestos, wollastonite, diatomaceous earth, quartz powder, clay, fumed silica, precipitated silica, zirconium silicate, magnesium silicate, lithium silicate, and aluminum silicate.

In addition, the composition of the invention may include some known additives, such as iron oxide, magnesium oxide, titanium dioxide, calcium carbonate, and carbon black and, in order to improve the molding workability, aluminum, calcium, zinc and cobalt salts of stearic acid, wax and other stabilizers, in suitable amounts.

The curing catalysts used in the preparation of the silicone resin molding compositions of the invention may be lead, cobalt, or manganese salt of naphthenic acid, known as driers for alkyd resins, but more preferably a combination of at least one inorganic or organic salt of lead, cobalt or manganese compound with at least one selected from the group consisting of polyol, organic carboxylic acid, and its ammonium salt and anhydride, for improving the molding workability and also for rapid curing after lapse of a certain time.

For preparing the silicone resin compositions of the invention, ester-modified organopolysiloxane resins, fillers, curing catalysts, and other additives, if necessary, are uniformly mixed on a high-speed rotary mixer like a hot roll or a Henschell mixer, and the mixture is cooled and then subjected to suitable pulverization. The compositions thus obtained are characterized by a viscosity they have when molten which is lower than conventional silicone resin compositions and the like. Therefore, in the transfer molding in which the composition is used, a comparatively low pressure, i.e., from 100 to 500 psi may be applied so that precise electronic machinery parts may be molded without breaking of the fine wirings.

When the silicone resin compositions of the invention are heated up to 160°C or above, they become rapidly cured and give molded products having superior moisture resistance and adhesion to metallic surfaces as described before; therefore they are applicable for various uses including packaging of semiconductor materials.

The following examples are illustrative of the invention. Parts are all by weight.

EXAMPLE 1

A mixture of 11 parts of linseed oil fatty acid and 2 parts of glycerine (OH/COOH = 1.2) was reacted at a temperature between 200°C and 240°C for 2 hours. The resulting ester (molecular weight: about 330), having an acid value of 10, was added to 245 parts of organopolysiloxane represented by the mean unit formula $(C_6H_5)_{0.60}(CH_3)_{0.725}SiO_{1.337}$ and the mixture was heated at a temperature between 120°C and 140°C for 2 hours, to obtain a modified organopolysiloxane resin, containing 0.8% by weight of silicon atom-bonded hydroxyl group.

Subsequently, to 257 parts of the modified organopolysiloxane resin thus prepared were added 726 parts of fume silica (100% 325 mesh pass), 3 parts of calcium stearate, and 1 part of black pigment, and mixed on two rolls at 80–100°C for about 10 minutes. To the mixture was added 2 parts of lead monoxide and 2 parts of 2-ethylhexylic acid and further kneaded for 5 minutes. The kneaded mixture was allowed to stand for cooling down to room temperature and then pulverized. The product obtained was a silicone resin composition having the following properties with respect to spiral flow, moisture resistance and fixing to metallic surfaces.

SPIRAL FLOW

A spiral flow tester of Hull Company was operated under the conditions of 175°C and 500 psi to determine the spiral flow of the compositions to be 35 inches. When the composition was heated in a metal mold at 175°C for 3 minutes, it was sufficiently cured, to produce a good molded article. The mold article was further heated at 200°C for 2 hours; and found well-set and blister-free.

MOISTURE RESISTANCE

The composition was molded at 175°C and under 56 kg/cm². Then it was further heated at 200°C for 2 hours to produce a 0.8 mm thick sheet. In accordance with JIS Z-0208, a moisture permeation cup (relative humidity: 85%, temperature: 40°C, and air-circulation velocity: above 1m/sec.) was employed in order to know the vapor permeation velocity of the sheet. The value obtained was 0.8 g/m²/24 hrs.

As a control, a similar test was conducted on a sample (0.8 mm thick sheet) prepared in a similar manner from an organopolysiloxane resin which had not been modified with an ester. The vapor permeation velocity in this case was 3.0 g/m²/24 hours, much inferior to the one given above.

FIXING TO METALLIC SURFACES

About 0.15g of the composition was molded under the pressure of 100 kg/cm² into a 1-mm thick tablet, and broken into 4 parts, each almost equal in size. One of them was placed between two pieces of metal plates of various kinds having flat and round surfaces (each having an area of 0.5 cm²), and heat-pressed at 175°C under the pressure of 2 kg/cm² for 3 minutes to carry out complete curing. Subsequently, the set of metal plates was taken out and cooled. Then, the fixing of the cured resin to various metal surfaces was tested by means of an autograph at the tensile velocity of 1.5 mm/min. The results obtained are given in the following table. It is to be noted that the composition used in the control was one prepared from an organopolysiloxane resin which had not been modified with an ester.

|  | Iron | Tin | Silver | Chromium | Copper |
|---|---|---|---|---|---|
| Silicone resin composition of the invention, kg/cm² | 20 | 18 | 12 | 14 | 25 |
| Control, kg/cm² | None | 8 | None | None | None |

EXAMPLE 2

A mixture of 30 parts of linseed oil fatty acid, 9 parts of glycerine and 11 parts of phthalic anhydride (OH/COOH = 1.2) was reacted at a temperature between 200°C and 220°C for 2 hours. The resulting ester (molecular weight: about 430), having an acid value of 15, was added to 450 parts of organopolysiloxane represented by the mean unit formula $(C_6H_5)_{0.65}(CH_3)_{0.50}SiO_{1.42}$ and the mixture was heated at a temperature between 200°C and 220°C for 2 hours, thereby producing a modified organopolysiloxane resin containing 0.6% by weight of silicon atom-bonded hydroxyl group.

Subsequently, to 250 parts of the modified organopolysiloxane resin thus prepared were added 428 parts of fume silica, 300 parts of glass fiber, 3 parts of zinc stearate, 10 parts of black pigment, and 4 parts of lead carbonate and the mixture was kneaded on 2 rolls for about 20 minutes. The product obtained proved to be a composition useful as a transfer molding material, with its spiral flow value of 45 inches under the conditions of 175°C and 400 psi, and yet sufficiently thermosetting in 5 minutes at the same temperature to give excellent molded products.

EXAMPLE 3

An ester prepared by reacting, as desceibed in Example 1, linseed oil fatty acid and glycerine (OH/COOH = 1.5) was added in amounts given below to organopolysiloxane represented by the mean unit formula $(C_6H_5)_{0.60}(CH_3)_{0.725}SiO_{1.337}$ and the mixtures were each reacted, as in Example 1, thereby obtaining three kinds of modified organopolysiloxane resins.

| | |
|---|---|
| Modified Resin I. | |
| Organopolysiloxane | 98 parts |
| Ester | 2 parts |
| Modified Resin II. | |
| Organopolysiloxane | 95 parts |
| Ester | 5 parts |
| Modified Resin III. | |
| Organopolysiloxane | 90 parts |
| Ester | 10 parts |

To each of the modified resins were added 292 parts of fume silica, 2 parts of aluminum stearate, 3 parts of black pigment, 1.5 parts of lead carbonate and 1 part of ammonium benzoate. The mixtures were each kneaded as described in Example 1. The compositions thus obtained were molded at 175°C under 500 psi for 5 hours, and further after-cured at 200°C for 5 hours to produce molded articles. The polished surfaces of the molded products, when observed under a metallurgical microscopes (magnification: 150), proved that those prepared from Modified Resins II and III, respectively, were of fine texture, free from microvoids, while the one prepared from Modified Resin I had some microvoids.

EXAMPLE 4

Soybean oil fatty acid and glycerine (OH/COOH = 1.5) were reacted with each other, to produce 3 esters having different acid values, namely, 120, 40 and 5. To each of these esters was added an organopolysiloxane of the mean unit formula $(C_6H_5)_{0.60}(CH_3)_{0.725}SiO_{1.337}$ for reaction, as in Example 1, to obtain 3 kinds of modified organopolysiloxane, namely, Modified Resins I, II and III, respectively. Then, each of the modified resins was treated similarly to Example 2, to obtain composition products. These compositions were then subjected to pulverization; the composition prepared from Modified Resin I was so soft that the pulverization was difficult; the composition prepared from Modified Resin II was easily pulverized but tended to coagulate; the composition from Modified Resin III was easily pulverized, to produce a stable powdered product.

Further, the compositions thus obtained were molded at 175°C under 56 kg/cm² pressure for 3 minutes. The molded articles prepared from modified resin I had many blisters, the articles from modified resin II were free from blisters but the hardness of them was insufficient, and the articles from Modified Resin III were free from blisters and curing was satisfactory.

EXAMPLE 5.

An ester having an acid value of 5 prepared by reacting linseed oil fatty acid and glycerine was added to organopolysiloxane of the mean unit formula $(C_6H_5)_{0.60}(CH_3)_{0.725}SiO_{1.337}$ for reaction as in Example 1, to obtain 3 kinds of Modified Resins I, II and III, the first without heating, the second with heating at 120°–140°C for 2 hours, and the third with heating at the same temperature for 6 hours. Then, each of the modified resins was treated similarly to Example 1, to obtain composition products.

With these composition products, tests of spiral flow and bonding to metallic surfaces were carried out as done in Example 1. The results of the tests are as follows.

Spiral flow:

| | | |
|---|---|---|
| Product from Modified Resin I: | Flow - | 60 inches, with fins or flashes around the spiral. |
| Product from Modified Resin II: | Flow - | 40 inches, with no fins. |
| Product from Modified Resin III: | Flow - | 28 inches. |

Fixing to metallic surfaces:

| | Iron | Silver | Chrome | Copper |
|---|---|---|---|---|
| Modified Resin I | 8 | 4 | 2 | 30 |
| Modified Resin II | 18 | 15 | 10 | 22 |
| Modified Resin III | 8 | 2 | 6 | 10 |

Note: Modified Resin II shows the best results, among others.

EXAMPLE 6

A mixture of 245 parts of organopolysiloxane having the average unit formula $(C_6H_5)_{0.60}(CH_3)_{0.725}SiO_{1.337}$ and 15 parts of usual butyric acid polyethylene glycol ester was subjected to reaction under the same conditions as Example 1, to obtain a modified organopolysiloxane resin. Then, to 250 parts of this modified organopolysiloxane resin thus obtained were added first 428 parts of fume silica, 300 parts of glass fibers, 3 parts of cobalt stearate, and 10 parts of black pigment and subsequently 4 parts of lead carbonate and 4 parts of 2-ethyl hexanoic acid, and the mixture was kneaded and pulverized in the same manner as Example 1, to produce the desired silicone resin composition. The composition was proved to have a flow of 30 inches as the result of the spiral flow test, and further to be capable of giving a satisfactory molded article having no blister nor fins, sufficiently cured by heating at 175°C for 3 minutes, which are suitable for the transfer molding.

EXAMPLE 7

A mixture of linseed oil fatty acid and glycerine, similar to that of Example 1 was reacted with organopolysiloxane having the average unit formula $(C_6H_5)_{0.60}(CH_3)_{0.725}SiO_{1.337}$ under the same conditions as Example 1, and the resulting product was added with the additives, kneaded and pulverized to obtain a modified organopolysiloxane resin. With this modified organopolysiloxane resin, the desired composition was prepared. A finished molded product from the composition was applied to observation by a metallurgical microscope to find that its polished surface was free from microvoids.

What is claimed is:

1. A silicone resin molding composition comprising essentially (a) an ester-modified organopolysiloxane resin which is produced by modifying an organopolysiloxane resin containing substituted or unsubstituted silicon-bonded organic monovalent hydrocarbon groups, the ratio of the organic groups to silicon atoms being from 1:1 to 1.6:1, and hydroxy groups bonded to silicon atoms in an amount larger than 0.25% by weight, with at least one ester having molecular weight exceeding 300 and produced by the condensation reaction of an aliphatic alcohol and an organocarboxylic acid, said ester-modified organopolysiloxane resin being produced by heating the mixture of 100 parts by weight of said organopolysiloxane resin and from 3 to 30 parts by weight of said ester at an elevated temperature, (b) an inorganic filler selected from the group consisting of glass powder, asbestos, wollastonite, diatomaceous earth, euartz powder, clay, fumed silica, precipitated silica, zirconium silicate, magnesium silicate, lithium silicate, and aluminum silicate, and (c) a curing catalyst wherein said curing catalyst is selected from the group consisting of inorganic and organic salt of lead, cobalt and manganese and mixtures thereof with polyols, organic carboxylic acids, ammonium carboxylates or carboxylic acid anhydrides.

2. The compositions as claimed in claim 1 wherein said ester-modified organopolysiloxane resin is produced by modifying 100 parts of said organopolysiloxane resin with from 5 to 20 parts by weight of said ester.

3. The composition as claimed in claim 1 wherein said ester-modified organopolysiloxane resin is produced by modifying said organopolysiloxane with at least one ester having a molecular weight exceeding 300, produced by the condensation reaction of an aliphatic alcohol and an organic carboxylic acid and containing an ester of glycerine and an unsaturated higher carboxylic acid.

4. The composition as claimed in claim 1 wherein said ester-modified organopolysiloxane is produced by modifying said organopolysiloxane resin with at least one ester having a molecular weight exceeding 300 and having an acid value not exceeding 50.

5. The composition as claimed in claim 1 wherein said ester-modified organopolysiloxane resin is produced by adding to said organopolysiloxane resin at least one ester having a molecular weight exceeding 300, produced by the condensation reactions of an aliphatic alcohol and an organic carboxylic acid and containing an ester of glycerine and an unsaturated higher carboxylic acid and heating the mixture.

6. The composition as claimed in claim 1 which comprises a blended mixture with aluminium, calcium, zinc and cobalt salts of stearic acid, waxes and/or stabilizers.

7. A silicone resin composition for transfer molding consisting essentially of (a) an ester-modified organopolysiloxane resin which is produced by modifying 100 parts by weight of an organopolysiloxane resin containing substituted or unsubstituted silicon-bonded organic monovalent hydrocarbon groups, the ratio of the organic groups to silicon atoms being from 1:1 to 1.6:1, and hydroxy groups bonded to silicon atoms in an amount larger than 0.25% by weight, with from 3 to 30 parts by weight of at least one ester having molecular weight exceeding 300 and produced by the condensation reaction of an aliphatic alcohol and an organocarboxylic acid, (b) an inorganic filler selected from the group consisting of glass, powder, asbestos, wollastonite, diatomaceous earth, quartz powder, clay, fumed silica, precipitated silica, zirconium silicate, magnesium silicate, lithium silicate, and aluminum silicate, and (c) a curing catalyst wherein said curing catalyst is selected from the group consisting of inorganic and organic salts of lead, cobalt and manganese and mixtures thereof with the polyols, organic carboxylic acids, ammonium carboxylates and carboxylic acid anhydrides.

* * * * *